US010601780B2

(12) United States Patent
Hoy et al.

(10) Patent No.: US 10,601,780 B2
(45) Date of Patent: *Mar. 24, 2020

(54) INTERNET ISOLATION FOR AVOIDING INTERNET SECURITY THREATS

(71) Applicant: L3 TECHNOLOGIES, INC., New York, NY (US)

(72) Inventors: Robert B. Hoy, Sewell, NJ (US); Mark Fenkner, Marlton, NJ (US); Sean W. Farren, Newburyport, MA (US)

(73) Assignee: L3Harris Technologies, Inc., Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/910,734

(22) Filed: Mar. 2, 2018

(65) Prior Publication Data

US 2018/0191684 A1  Jul. 5, 2018

Related U.S. Application Data

(63) Continuation of application No. 13/981,896, filed as application No. PCT/US2012/023027 on Jan. 27, 2012, now Pat. No. 9,942,198.

(Continued)

(51) Int. Cl.
*H04L 29/06* (2006.01)
*G06F 21/53* (2013.01)
*G06F 9/455* (2018.01)

(52) U.S. Cl.
CPC ...... *H04L 63/0272* (2013.01); *G06F 9/45558* (2013.01); *G06F 21/53* (2013.01); *H04L 63/101* (2013.01); *G06F 2009/45587* (2013.01)

(58) Field of Classification Search
CPC ..... H04L 63/0272; H04L 63/101; H04L 9/00; H04L 9/32; G06F 9/45558; G06F 21/52;

(Continued)

(56) References Cited

U.S. PATENT DOCUMENTS 7,478,330 B1   1/2009  Branson et al.
7,698,442 B1   4/2010  Krishnamurthy et al.
(Continued)

FOREIGN PATENT DOCUMENTS

RU   2406138 C1   12/2010

OTHER PUBLICATIONS

Reuben, Jenni Susan, "A Survey on Virtual Machine Security", TKK T-110.5290 Seminar on Network Security, Oct. 11-12, 2007, 5 Pages.*

*Primary Examiner* — Thanhnga B Truong
(74) *Attorney, Agent, or Firm* — Condo Roccia Koptiw LLP

(57) ABSTRACT

A host computer supports a virtual guest system running thereon. The host system has a firewall that prevents it from communicating directly with the Internet, except with predetermined trusted sites. The virtual guest runs on a hypervisor, and the virtual guest comprises primarily a browser program that is allowed to contact the Internet freely via an Internet access connection that is completely separate from the host computer connection, such as a dedicated network termination point with its specific Internet IP address, or by tunneling through the host machine architecture to reach the Internet without exposing the host system. The virtual guest system is separated and completely isolated by an internal firewall from the host, and the guest cannot access any of the resources of the host computer, except that the guest can initiate cut, copy and paste operations that reach the host, and the guest can also request print of documents. The host can transfer files to and from a virtual data storage area accessible by the guest by manual operator action. No other transfer of data except these user initiated actions is permitted.

20 Claims, 2 Drawing Sheets

Related U.S. Application Data

(60) Provisional application No. 61/436,932, filed on Jan. 27, 2011.

(58) Field of Classification Search
CPC .. G06F 2009/45587; G06F 9/46; G06F 21/00; G06F 15/173; G06F 21/53; G06F 9/455; G06F 15/16
USPC ............. 718/1; 726/1, 15, 24; 709/223, 229, 709/235, 245, 225; 713/170
See application file for complete search history.

(56) References Cited

U.S. PATENT DOCUMENTS

| | | |
|---|---|---|
| 8,185,642 B1 * | 5/2012 | Tock ..................... H04L 63/102 709/225 |
| 2002/0069369 A1 | 6/2002 | Tremain |
| 2006/0005188 A1 * | 1/2006 | Vega ..................... G06F 9/5077 718/1 |
| 2006/0070066 A1 | 3/2006 | Grobman |
| 2007/0220187 A1 | 9/2007 | Kates |
| 2007/0260873 A1 | 11/2007 | Hatfalvi et al. |
| 2008/0028401 A1 | 1/2008 | Geisinger |
| 2008/0201711 A1 | 8/2008 | Amir Husain |
| 2008/0256536 A1 | 10/2008 | Zhao et al. |
| 2009/0172781 A1 | 7/2009 | Masuoka et al. |
| 2009/0328038 A1 | 12/2009 | Yamada et al. |
| 2010/0138829 A1 | 6/2010 | Hanquez et al. |
| 2010/0138830 A1 | 6/2010 | Astete et al. |
| 2010/0174811 A1 * | 7/2010 | Musiri .................. G06F 15/173 709/223 |
| 2010/0223613 A1 | 9/2010 | Schneider |
| 2010/0251329 A1 * | 9/2010 | Wei ..................... H04L 63/1408 726/1 |
| 2012/0023593 A1 | 1/2012 | Puder et al. |

* cited by examiner

INTERNET ISOLATION FOR AVOIDING INTERNET SECURITY THREATS

CROSS REFERENCE TO RELATED APPLICATIONS

This application is a continuation of U.S. patent application Ser. No. 13/981,896, filed Jul. 29, 2013, which is a National Stage Entry under 35 U.S.C. § 371 of Patent Cooperation Treaty Application No. PCT/US2012/023027, filed Jan. 27, 2012, which claims priority from U.S. Provisional Application No. 61/436,932, filed Jan. 27, 2011, which are herein incorporated by reference in their entirety.

FIELD OF INVENTION

This invention relates to the protection of computer systems from injurious software that can be encountered while browsing or accessing the Internet, and also to the protection of local Internet networks (LANS) that have access to the Interact.

DESCRIPTION OF THE PRIOR ART

The Internet provides access to a large number of computer systems from which beneficial or harmful data may be retrieved by a computer attached to and communicating over the Internet. Harmful data that can be accessed through the Internet includes a variety of viral software constructs, generally referred to as malicious software or malware. Malware normally is downloaded to a computer completely unintentionally and without the knowledge of the individual computer user.

The results of an infection of the computer system are possible malfunctions or inefficiency. In addition, there are possible security losses, such as the loss of all data that is accessible to that computer system and the installation of various types of subservient software on the infected system that allows for the control of Internet operations or other activities of the computer from a remote location unknown by the user.

One typical way that such malware is delivered to an uninfected computer system is that the user of the system accesses a website through an Internet browser such as Internet Explorer or Firefox, or any of a variety of other well-known programs configured for browsing on the Internet, and receives from that website a data packet that contains malicious code. This malicious code may be automatically downloaded to a user's computer through a webpage, the website URL of which may have been emailed to the user, or the user may have purposely accessed the website because the user is familiar with it. In either case, the website has secretly been hacked to carry the malicious code in its HTML coding. The hacked webpage has code that redirects the user to a mothership server hosting the real exploit. If the exploit is successful due to a vulnerability, etc., a toolset is then silently installed on the user's computer, with results that will be described below.

Another typical exploit that is used to attempt to introduce malicious software to a system is via an attachment (typically a PDF) that is either received or downloaded from a website. When opened, the attachment starts a hidden stub code that exploits a vulnerability in, for example, the application Adobe Reader where the attack is via a PDF exploit. The stub code is a small piece of code that when opened by the browser initiates on the host computer a software operation that listens to a specified remote Internet server via a port of the host computer. The port is usually port 80 or Port 443, both of which are normally universally allowed ports on ordinary computer systems through which the Internet can be accessed. The stub code program downloads a secondary payload software module, commonly an .exe file, from the remote Internet server. This secondary payload is loaded into the host computer, which is at this point infected. The secondary payload file then executes and starts performing various functions according to a toolset.

The toolsets of either exploit technique comprise software that may do any of the following functions:

i. the toolset performs and reports a recon of the system to assess what is available there as a resource and the files, etc., stored at the computer or accessible to it over its LAN;

ii. the toolset makes a determination of and reports the user's system privileges, which can be then used to access data on any associated network or LAN, local files stored on the infected machine are then also accessed and potentially transmitted over the Internet to a remote site. This may include an upload of the local security database, from which the malware controllers can derive the credentials of any privileged user that ever logged into the infected host computer system. Also the malicious software allows its creators to simply capture and reuse directly from random access memory of the infected host computer, or from a network data stream, the security token or hash of the user, where the user is privileged, and use that token or hash to gain privileged access to other resources on the LAN.

iii. the toolset creates a door that provides remote control and access to the infected system, which allows a remote system unknown to the user of the infected system to control all operations of the host system and have it perform whatever tasks are desired, which may vary between simply downloading data on the infected system to access other websites for denial of service Internet attacks, or a variety of other alternative uses that an enslaved, infected computer can do. This control also allows the remote malicious entity to make a variety of uses of the infected host system. It may even convert the infected host into a source of malicious software itself, causing it to act as another mothership server from which toolsets or secondary payloads are downloaded to other subsequently infected computer systems.

The security and privacy of the user and all confidential information on the user's computer and any associated LAN resources are available to access at this point by the remote entity that controls the operation of the toolset. Even apart from the breach of security, however, the malware, at a minimum, results in a reduction in efficiency of the system due to additional processor demand incurred by the executing malware.

Security systems of various designs have been developed to try to address the problem. For instance, it is possible to use two separate computers, one accessing the Internet and the other connected only with a LAN that is completely isolated from the Internet. This results in a double cost of equipment, and also there is a problem transferring legitimate data between the machines when necessary and appropriate. Other more software-intensive methods of restricting have also been tried, but these usually expand the demand for bandwidth undesirably, or else do not provide airtight protection against loading of malware.

SUMMARY OF THE INVENTION

It is accordingly an object of the present invention to provide a system for a computer that will allow safe browsing without a risk of such infection.

It is further an object of the invention to eliminate the ability of trusted internal host systems on a secure LAN to access the Internet, but to provide access to the Internet through a secure isolated service that can access the Internet, but not the internal trusted LAN sites.

It is further an object of the invention to provide a method for secure file exchange to transfer data between the Internet and the trusted hosts of the trusted LAN.

It is still further an object of the invention to allow Internet access from only the bare mini an of servers or devices in the LAN that require it, and to restrict where they can go.

It is further an object of the invention to provide a system that rigorously monitors any exceptions, including DNS and SMTP exceptions, which might indicate a compromise of any trusted host system on the LAN.

It is also an object of the invention to provide a scalable system that can be applied to a variety of host system architectures or hardware configurations, supporting both laptop and desktop host systems.

According to an aspect of the invention, this is accomplished by a system in which a host computer supports a virtual guest system running thereon. The host system has a firewall thereon such that the host computer cannot communicate directly with the internet, except with predetermined trusted sites stored in an internal whitelist data. The virtual guest runs on a hypervisor, and the virtual guest comprises primarily a browser program that is allowed to contact the internet freely via an internet access connection that is completely separate from the host computer connection, such as a dedicated network termination point with its specific internet IP address, or by tunneling through the host machine architecture to reach the internet without exposing the host system. The guest is separated and completely isolated by an internal firewall from the host, and the guest cannot access any of the resources of the host computer, except that the guest can initiate cut, copy and paste operations that reach the host, and the guest can also request print of documents. The host can transfer files to and from a virtual data storage area accessible by the guest by manual operator action. No other interaction is permitted.

According to another aspect of the invention, a networked computer system comprises a local network configured to carry electronic communication signals between computers connected therewith. A connection on the local area network communicates with the Internet, and a plurality of computer stations are each connected with the local network so as to communicate thereacross. Each computer station operates as a host system according to stored data corresponding to an operating system and one or more program applications. The host system communicates over the local network but is restricted against communication with the Internet, except with predetermined Internet sites that have been identified as safe to access. Each computer station also supports operation of a respective virtual computer system thereon. The virtual computer system communicates via a virtual conduit connection over the local area network with the connection to the Internet, but wherein the virtual computer system is isolated against any other communication over the local area network. Each computer station is isolated against any communication of data to or from the respective virtual computer system operating thereon, except for a limited set of types of permitted data transfers.

According to another aspect of the invention, a method of safely browsing the Internet comprises providing a host computer system operating according to a stored operating system and one or more stored program applications, and having operating thereon a firewalled virtual computer system with which the host computer system has restricted communication of data. The method further comprises accessing the Internet using a first browser program running on the virtual computer system.

According to another aspect of the invention, a computerized work station comprises a computer operatively connected with one or more user-accessible data entry devices, a display device viewable by the user, and computer-accessible data storage providing for the computer an operating system and one or more applications programs that run on said operating system, and supporting a virtual computer system operating on the computer. The computer is able to access the Internet using a browser program running on the virtual computer system such that the browser displays information obtained from the Internet on the display. Data transfers to and from the virtual computer system are limited to a set of types of transfers that limit the possibility of malicious data from the Internet moving from the virtual computer system to another portion of the computer system.

According to still another aspect of the invention, a computer system for browsing the Internet while connected with a local area network comprises a computer having a computer-accessible data storage, an input device connected therewith and a display viewable by a user of the computer. The computer has stored thereon software causing the computer to operate as a host computer system executing application programs and accessing other computerized devices on the local area network, and as a virtual guest computer system operating independently of the host computer system. The host and guest computer systems are able to communicate therebetween only according to a predetermined set of limited interaction processes. The host system has access to the Internet wholly or partially blocked, such that the host system can only communicate with sites that are identified in stored whitelist data. The virtual guest computer system has access blocked to the host computer system and to the local area network. The virtual guest computer system accesses the Internet through the local area network via a virtual conduit to an Internet connection point linked to the local area network.

The above architecture is preferably implemented by commercial-off-the-shelf (COTS) hardware, all of which is readily available. The computers described herein and the networks, both local area and the internet, rely on the standard well known network hardware now in common use. The separate internet access for the virtual guest is preferably provided by a COTS system used in virtual private networks (VPNs). The firewalls and other communication restrictions of the system are implemented preferably by software, i.e., using computer-readable instructions stored on the computer systems that cause those computer systems to operate according to the firewall and communications architecture as described herein.

According to an aspect of the invention, this is accomplished by providing a host computer that is surrounded by a host based firewall. The firewall allows the host to access addresses on the LAN but blocks any access to any address on the Internet, except for Internet addresses that are specifically whitelisted, i.e., predetermined to be trusted sites. In the preferred embodiment, the firewall inter alia prevents or disables any access to the usual Internet access ports, e.g., ports 80 and 443, which are also the ports that are usually used by executing stub code of an infection to access the Internet without knowledge of the user. Because these are also the usual ports used to access the Internet by a browser in ordinary use in the prior art, the host computer consequently does not have any direct contact to and cannot communicate with the Internet through its ports, except that the host computer is permitted to access other sites on the secure LAN itself through these ports, and also trusted Internet sites that are predetermined and stored in whitelist data accessible to the host computer (or to the LAN firewall).

Also operating on the host computer is a hypervisor system that creates a virtual machine environment that is separate from the host computer's operating system. This virtual machine has a virtual guest operating system on which a modified browser is run. The browser is activated by a desk-top shortcut or application on the host system that allows the user to link to the isolated Internet access of the virtual guest system by launching the virtual guest web browser, which operates transparently to the user in the virtual guest system.

The virtual guest system browser is configured to access the Intent only through a specific and unique Internet access point identified by a unique IP address, e.g., 10.1.xxx.xxx, or 255.255.2xx.xxx, for that specific virtual guest system. The virtual guest system has, as part of its virtual architecture, ports 80 and 443, and generally operates internally as a normal browser, except that it relies on a dedicated connection to get to the Internet. Because it is exposed to potentially malicious software as it browses the Internet, the virtual guest system browser and its virtual operating system may be a hardened version that is exceptionally resistant to corruption, or it may have enhanced anomaly detection to aid in noting when dangerous data has been encountered by the browser. The virtual guest system also has no connection whatsoever to the LAN, and cannot access any address on the LAN.

In the preferred embodiment, the unique IP address is provided by a virtual private network (VPN) termination point device on the LAN that is connected to the virtual guest system and its browser through the LAN by a VPN. In this LAN embodiment, the host computer firewall allows the host computer to communicate only with IP addresses on the LAN, and the host computer can only communicate with the Internet through the virtual guest system communicating through the VPN to the VPN termination point. The VPN termination point is connected by a local hardwired connection to the firewall between the LAN and the Internet, and it connects directly to the firewall without passing through the LAN. Consequently all Internet traffic from the host computer is restricted to run only from the virtual guest system through the scaled conduit of the VPN, and then through the firewall and into the Internet at large. There is no contact between the Internet traffic and the LAN.

The virtual guest system browser may alternatively be connected to the Internet access point directly as a local hardware device connected directly to the host computer without an intervening network or LAN. In this embodiment, a single computer connected directly to an Internet access point may be provided with protection against malware in the absence of a trusted local network.

The guest computer and the host computer communicate with each other by a limited permissible internal host-based firewall in the host system that is provided by the hypervisor or some other local program. Communications across this internal firewall between the guest system and the host system are limited to cut and paste of displayed documents or files, commands to print documents, and file transfer requested manually by the host (i.e., directed intentionally by the human user of the given system).

As a result of this arrangement, should the guest browser system access a website that returns some malware stub code over the Internet, the stub code is executed on the guest browser. The guest browser will then access the "mother ship" site with the secondary malware payload via its virtual ports 80 or 443 as directed to by the stub code software, and it will download the secondary payload executable module onto the virtual guest machine, which is configured by the hypervisor as essentially a blank PC with a browser and isolated from the real host computer. The secondary payload will then nm on and access the virtual or pseudo guest machine, which has no files or system assets that are usable for the infection of a system.

The guest system is compromised at this point. However, the guest computer in the virtual machine has no access to the other computers on the network or even to the system assets or files of the host system itself, except to cut, paste, or print. This is the limit of the infection, and there is no compromise to the host system security.

The compromised guest system may start to encounter problems, and might even become inoperable with the malware running if it is forced to function as a netbot or remote controlled device working for the mother ship site. However, the hypervisor stores a pristine copy or clean slate of the entire virtual guest system, and that pristine copy can be reloaded in place of the existing virtual guest machine, either periodically, e.g., once a day or once an hour, or on command of the user when there might be an infection. The infected virtual guest system therefore can be cleared immediately and reverted to its original condition without any harm to the actual host computer.

Even if malware were to get through the firewall and initiate an executable module on the host operating system instead of the virtual guest system, such as by a virus attached to an email or contamination by a USB memory stick or other hardware device that introduces a virus to the host operating system behind the host firewalls, nonetheless the malware module would not be able to access the Internet because the ports on the host machine are disabled for Internet access. With the malware unable to communicate outside the local area network, there would be no exfiltration of data, and malware beaconing, or any possibility of remote command and control. Furthermore, the blocked attempts to access the generally disabled or blocked ports 80 or 443 (or whatever other ports may appropriately be disabled or blocked) can be detected as an indication that the host computer is infected. If an infection is detected, then the host system could then be scrubbed or rebuilt, and the security compromise would have had only minimal effect.

Other advantages of this invention will become apparent from the foregoing specification.

DETAILED DISCLOSURE OF THE INVENTION

Figure 1:
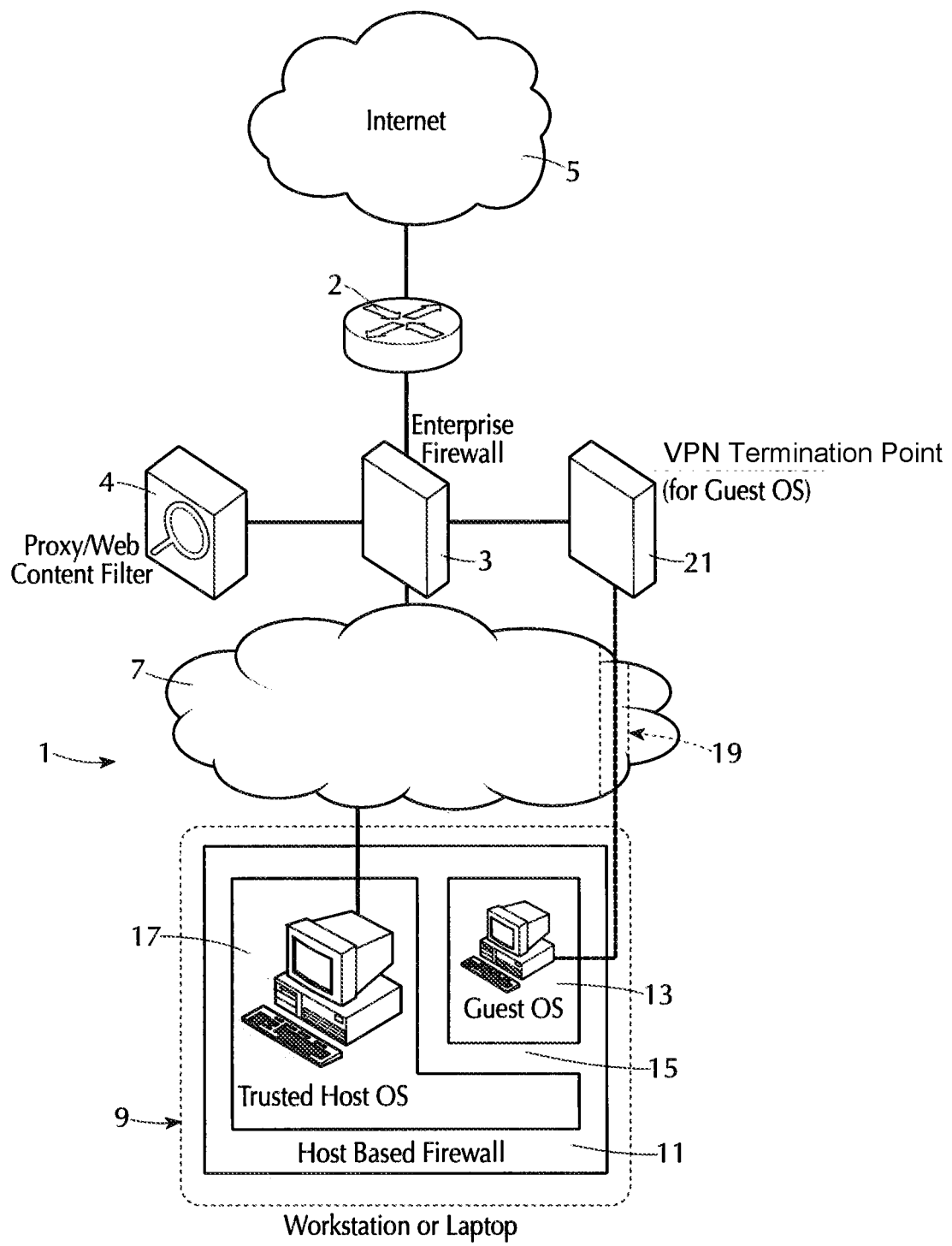
FIG. 1 is a diagram of an exemplary system on a local area network using the Internet isolation system of the present invention.

Referring to FIG. 1, a networked computer system generally indicated at 1 is linked to the Internet 5 via a firewall 3 and a router 2 of conventional configuration that is well-known in the art. A proxy/web-content filter 4 is connected with and cooperates with the firewall hardware 3 to control the type of data permitted to pass from the Internet 5 into the local system 1, filtering e.g., pornographic material or data not intended for the system 1, and also blocks communications from users on the LAN trying to reach disallowed sites, e.g., requests to access www.onlinecasino.com. The local system 1 includes a trusted local area network (LAN) 7 that transmits electrical data signals between a plurality or large number (not shown) of computer systems each identified by a unique LAN address. The computers include at least one workstation or laptop generally indicated at 9. Each of the computers on the LAN 7 is configured similarly to the computer system 9 to prevent malware intrusion from the Internet.

The workstation 9 can be virtually any host computer system, including a PC or a laptop or any of a variety of other computer systems with electronically accessible data storage, a user visible display, and input devices such as a keyboard and a mouse. As an example, the system may be a PC sold by Dell, with 4 GB RAM and 146 GB hard disk storage, a monitor, a keyboard and a mouse. The host system 9 stores thereon data providing an operating system that allows the host system 9 to function, e.g., a Windows or Linux operating system, as is well known in the art. It also stores data corresponding to all of the software needed for operation of the computerized workstation 9 in common operation, e.g., word processing programs, accounting programs, or any application that is supported on a computer. Also, the host computer system has a browser program that may be modified to enhance operation with a guest system, as will be discussed below.

The host system 9 also has stored data in the form of software instructions that cause the host system to have a host-based firewall 11 that provides restrictive egress from the computer 9. This host-based firewall 11 may be implemented using software such as, for example, that sold under the names Symantec Endpoint Protection or MacAfee Host-Based Security Systems.

This host based firewall 11 blocks all communications from the computer 9 except that it permits passage through it only of communications to the IP addresses of other computers on the trusted network 7. The firewall 11 specifically does not permit the computer 9 to access ports 80 or 443, and potentially also prevents access to ports 27 and to 77, and to any other ports that may or may become vulnerable to malware or security threats at some point in the future. This firewall 11 may allow the computer 9 only some limited use of these ports if the communication is purely with pre-determined trusted Internet sites, as will be described below. This firewall 11 is therefore a preventive barrier to any access of the Internet from host system 9 through its ports or directly to the firewall 3 via the LAN.

Host system 9 stores data defining software that when executed creates a hypervisor on the computer system 9. The hypervisor may be one of a variety of types of hypervisor, either software that executes directly as a separate operating system on the hardware of computer 9, or as a software module that operates based on the underlying operating system, e.g., Windows 7, of the computer 9. In either case, the hypervisor effectively creates a virtual machine operating on the host computer that has a virtual configuration different from the real hardware and software configuration of the computer 9. The hypervisor employed may include software packages or modules such as Med-V from Microsoft, Invincea, Microsoft-Virtual PC 2007 or Hyper-V, VMWare Player or ESX, or SUN Microsystems XVM Virtual Box. The virtual machine created by the hypervisor is illustrated in the diagram of FIG. 1 as the virtual guest system or guest OS 13.

In addition to forming the virtual guest system 13, the hypervisor also provides an additional internal host-supported firewall indicated at 15 that separates and restricts interaction between virtual guest system 13 and the trusted-host operating system 17, which is the standard operating system running the host computer 9, e.g., Windows 7 or another system that will support or cooperate with the hypervisor. Communications between the trusted host OS 17 and the guest OS 13 pass through the hypervisor firewall 15, and are limited to:

1. Cutting or copying of text visible on the screen;
2. Pasting of the text that has been cut or copied from what is visible on the screen;
3. Receiving a queued request lodged with the hypervisor by the guest OS 13 that the host system print files on a printer (not shown) connected with the workstation or laptop 9, and;
4. Transfer of files, when directed by the host computer OS 17, between a computer memory area (such as a respective desktop) or virtual data storage accessible to the virtual guest OS 13 and a computer memory area (such as a respective desktop) or data storage accessible to the host OS 17.

The guest OS pseudo machine or virtual guest system 13 is has its own virtual architecture and configuration. It preferably has virtual architecture of a very simple or gutted PC with a desktop area that can be accessed manually by a user of the computer system 9 to transfer files to be accessed by the virtual guest browser, but few if any associated system assets or I/O devices. The only files in the virtual machine 13 are those in its own desktop. The virtual guest system 13 shows no software installed except for a browser and possibly some related supportive software, such as Adobe or Windows Media Player that cooperate with the browser when certain types of files are accessed on the Internet, and potentially an email program such as Microsoft Outlook for certain configurations.

File transfer to and from the virtual guest system is very restricted, and can only occur in response to a user input directing the transfer. This allows for download and upload of documents, but the process requires slightly more user action than in an unprotected system of the prior art.

If a user is browsing and wishes to download a file from the Internet, the user will left click for download, as is standard in the art, and a dialog box will open in the browser in the guest system, asking the user where to store the file and under what name. The area available to store is a virtual data storage space that can be organized with folders by the user, as is well-known in the art. The user selects a file name and downloads the file into that virtual area. The user then goes to the Start Menu on his host computer, and this will offer him as one of the application choices "File Transfer". When selected and clicked, this will open a window similar to Windows Explorer displaying the files of the virtual data storage area of the virtual guest system. The user can select the file and copy it to any data storage area of the host system. The file then becomes available to the host and for access over the trusted LAN.

If a user wishes to upload a file to an Internet site, the user again accesses the File Transfer application running on the host system, and then copies the file form the data location in the host system into the virtual data storage of the virtual guest system. The browser than can be opened and when the browser dialog box opens in the guest system, the virtual data storage area of the guest is visible, and the file is visible there to be selected for uploading by the browser.

The host OS 17 has a desktop displayed to the user that includes an icon corresponding to the browser that runs in the virtual guest system 13. When this icon is clicked on by the user, it initiates the browser program running in the virtual guest system 13. The browser may be Firefox or Internet Explorer 6, 8 or whatever version of these is available, and other browsers may also be used with similar advantage. The virtual guest system 13 includes in its virtual architecture ports 80 and 443, access to which is permitted in the virtual guest system 13. These ports function to access the Internet, but the traffic does not go through real hardware ports on the host computer 9. Rather, the traffic between the Internet and the browser of the virtual guest system 13 is routed through a sealed "virtual conduit" 19 passing through the LAN. The virtual guest system 13 is able to communicate using its browser through only one mechanism, i.e. the virtual private network connection indicated at 19 that allows for the guest operating system to communicate over the trusted network 7 to a VPN termination point that is located adjacent the enterprise firewall 3.

This virtual conduit is really a software-generated Virtual Private Network (VPN) tunnel that encrypts data passing to and from the Internet and ensures that it is received or delivered to the virtual guest system 13 at one end and at VPN termination point 21 at the other end, without the possibility that the data thereof can reach any other location in the LAN except those two locations. The virtual guest system 13 uses Network Address Translation to support a captive VPN session to the VPN termination point 21. The VPN 19 is basically a tamper-proof conduit through the local area network 7 that prevents any contamination passing from the Internet to the guest OS or back outward from reaching any other system on the local area network. It can be analogized to a pipe full of toxin passing through an otherwise clean water supply.

The VPN termination point may be connected with the firewall 3 or integrated into it. Appropriate VPN termination point hardware devices are off-the-shelf systems such as the Check Point UTM-1 570, the Cisco ASA 5510 or Juniper Networks NetScreen. The VPN transmits data packets that are encrypted according to an IPSEC or SSL VPN tunnel construct protocol. The data in the VPN is transmitted over the LAN from the virtual guest system 13 on the host computer 9 in this encrypted form to the VPN termination point 21, where it is decrypted for transmission to the Internet. The VPN termination point includes hardware that is physically connected with the firewall device 3 outside of the LAN, not connecting with the firewall 3 through the LAN, and the VPN termination point includes in the data transmitted data defining a unique IP address for the specific virtual guest system 13, e.g., 10.1.xxx.xxx, or 255.255.2xx.xxx. This gives the appearance to the receiving Internet server that the virtual guest system 13 is not an IP address on a LAN, but a solitary PC without a LAN.

Similarly, data packets received from the Internet directed to the virtual guest system 13 pass through the firewall 3 and other standard prior art security measures applied where the Internet meets the LAN, such as filter 4, and these packets are then encrypted at the VPN termination point and then sent encrypted through the LAN to the host computer 9. At the host computer 9 at the other end of the VPN they are received and passed to the virtual guest system 13, where the data is decrypted and displayed by the browser.

The guest OS 13 can be easily infected or compromised and made unusable by the malware or other threats that it is exposed to. The browser is consequently preferably hardened to reduce its volatility in the face of such attacks. In addition, the hypervisor retains a virtual image of the virtual guest system 13 in its original pristine state free of any infections or history, so that the virtual guest system 13 can easily be reset to its pristine clean state, i.e., a clean slate, by reloading the data defining the uninfected virtual guest system 13. This is preferably done frequently in the system, e.g. once a day, so that there are no persistent infections that may develop in the virtual guest system 13.

It may occur that software installed on the host machine 17 requires live access to the Internet for proper operation of the software. For example, some software requires access to a certificate online to be executable. Similarly, access to online help from a software module requires that the host computer access the relevant websites. In either case, the host OS 17, not the guest OS 13 must access the Internet. To allow for this, the firewall 11 around the host OS 17 selectively enables the host OS 17 to access the Internet directly through ports 80 or 443, which are otherwise disabled, provided that the websites being accessed are on a whitelist of predetermined trusted sites with which the host OS 17 is permitted to communicate with.

The email program for the workstation 9 may be operated as a sort of browser application in the virtual guest system, with emails retained in the virtual guest system. Alternatively, where the LAN includes a server inside the LAN for email, the email program may be nm on the host OS.

The host computer system can in some cases be disconnected from the LAN and connected with a different network, as when a laptop is taken by a user to a remote location, such as, for example, to a hotel where it accesses the Internet using a different network. The host based firewall 11 (HBFW) remains on the computer system 9, but performs multiple predetermined functions based on whether the computer 9 is "home" (attached to the LAN) or "roaming" (disconnected from the LAN and connected via a non-secure network to the Internet).

At Home on the LAN:

The guest system, when the host is "home" on the trusted LAN network, is allowed by the HBFW only to egress the network through the VPN endpoint via a specified IP address using a predetermined port/protocol (i.e. UDP 500 or TCP 10000)

The home system, when the host is "home" on the trusted LAN network, is allowed by the HBFW to communicate to other LAN resources as well as any whitelisted sites outside the LAN on the Internet. All other egress ports/protocols/paths are blocked. If not, a malicious program could try and connect to a "mothership" via port 21, which is a well known port often allowed for access the internet for file transfers. It is possible for the IT personnel to configure the system to specifically allow or whitelist other ports or websites for necessary or reasonably permitted file transfers to known entities.

When Roaming:

The guest, when off the trusted network, is allowed by the HBFW to freely communicate on whatever network it is connected to. As a result, if the system is a laptop connecting to the Internet in a hotel room or via a Wi-Fi network, the computer system 9 can still connect to the Internet without requiring the VPN.

The host, when roaming on a nonsecure network, has all egress blocked by the HBFW.

LAN Firewall:

In addition to the HBFW, the LAN has LAN firewall 3, which further secures the local area network. On the network, it is not possible to determine if it is the guest or the host trying to communicate, because since both the host and the guest use the host IP address (The guest uses the NAT'd TCP/IP network address assigned to the host).

This LAN firewall device 3 is configured to block all host-based egress for all ports, protocols and destinations, with the exception of the following:
  i. the guest system can access the VPN endpoint using the host's NAT'd TCP/IP network address and will use a predetermined port/protocol (i.e. UDP 500 or TCP 10000)
  ii. Host egress is permitted via specified ports/protocols (80, 443) to any predetermined whitelisted sites that are required by host.

The LAN firewall does not address LAN access because the firewall is usually installed at the edge of the LAN to filter egress/ingress from the LAN, and is not between the host and any other IP address on the LAN.

Figure 2:
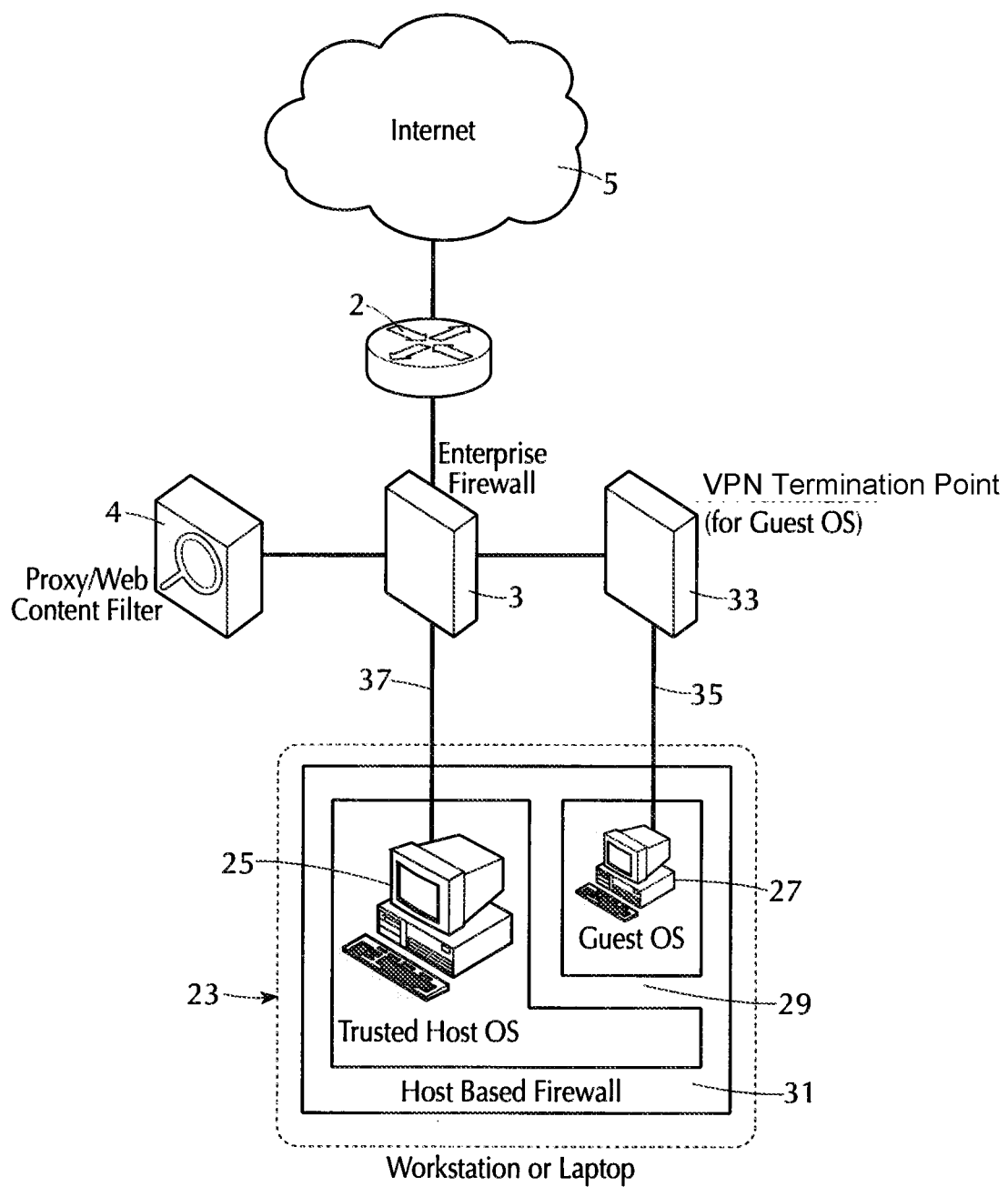
FIG. 2 is a diagram of a stand-alone computer system that is protected from infection from Internet sites by an architecture according to the present invention.

FIG. 2 shows an alternate embodiment of the invention with a single system attached to the internet without a LAN. FIG. 2 shows a number of components similar to those in FIG. 1, and in FIG. 2 similar parts have the same reference character numbers as in FIG. 1.

In the embodiment of FIG. 2, a computer system 23, such as a standard PC sold by Dell as described above, is connected with the Internet 5 through a router 2 and a firewall 3 as described above. Proxy content filter 4 may optionally be used to screen undesirable or inappropriate incoming or outgoing data, as above.

Computer system 23 has an internal architecture similar to the system 9 of the first embodiment. The system 23 includes a host system 25 running on the resident operation system, such as Windows or Linux, and a virtual guest system 27 defined by a hypervisor program running on the computer 23. The host and guest systems 25 and 27 are separated by an internal firewall 29 defined by the hypervisor that restricts the interaction between the host and guest in the same way that the firewall 15 of the first embodiment restricts communication between its host and guest systems.

The computer system 23 is also provided with a firewall 31 that limits communications from the host system 25. The host system 25 is blocked from communicating with any IP address, except that host system can communicate through the firewall 31 via a local hardwired connection to firewall 3 and through router 2 to access any sites on the Internet 5 that have been predetermined to be whitelisted or trusted sites, such as software certificate sites or software online help sites, as discussed above.

Because there is no LAN, the system 23 does not make use of a VPN. Virtual guest system 25 communicates over a hardwired connection to a VPN termination point device that gives the guest an IP address when browsing on the Internet. The firewall 31 allows the guest system 27 to communicate without restriction with any site on the Internet 5.

The hypervisor of the system 23 has a refresh or clean slate restoration process that restores the virtual guest system 27 to its original pristine state periodically, e.g., every 24 hours, or when an infection is detected or suspected, or simply responsive to a manual directive input from the user at the user's discretion.

This embodiment also provides protection against Internet malicious software threats by its isolation of the host system.

In a particularly preferred embodiment, the host and guest systems each have browser programs installed that facilitate access to the Internet without risk to the separation of the host from the virtual machine.

The host 17 runs a browser, which may be any typical browser, such as e.g., Internet Explorer, Mozilla Firefox, etc. The host browser has access to stored data defining a whitelist of trusted destination resources, usually IP addresses or sites, including the other accessible sites on the secure LAN and trusted sites on the Internet. An add-on checks for each address or site accessed whether it is on the whitelist. If so, the host browser accesses that address or site, and that is permitted by the host firewall 11 and the LAN firewall 3 if it is on the Internet. If the address that the host browser is trying to access is not a trusted LAN or Internet site in the whitelist data, the host browser immediately transfers the address or site to which access is sought to the guest browser.

The guest browser may be already running or it may be started by the host browser add-on. The guest browser will open to display the site to the user to be viewed in the guest browser, and then go to the non-whitelist site as discussed above, via the VPN or the non-firewalled connection to the Internet. Any malware or other deleterious data or code on the non-trusted site will be processed as above, remaining isolated in the guest computer system, unable to cross over the firewall back into the host computer.

The host monitors the guest browser at all times and screens any destination resource or address that the guest browser tries to access. If the there is an attempt to access a trusted whitelist site in the guest browser, then the host browser takes over the request clears the request in the guest browser. The host browser then opens on the user's display, and the request to access the trusted site will be processed from the host browser. Careful screening of the DNS, SMTP or other aspects of the communication is monitored by the firewalls to ensure that the system is not misled into communicating with an unsafe site directly from the host computer 17.

All the other aspects of the firewall 15 described previously are fully maintained to keep the systems isolated. Specifically, data from sites that are opened by the virtual guest system browser remains isolated in the virtual system behind the internal firewall 15, and can only be moved by the limited types of transfer described above, i.e., cut, copy, paste, print, etc.

While the present system relies on software implementations of many of the aspects of the invention, it will be understood that hardware analogues of the software implementations may also be employed.

The terms used herein should be seen to be terms of description rather than of limitation, as those of skill in the art with this disclosure before them will be able to make modifications and revisions thereto without departing from the spirit of the invention.

What is claimed is:

1. A networked computer system comprising:
   a network;
   at least one computer system configured to connect to the network, the computer system comprising a host system and a virtual system, wherein the virtual system is a separate operating system or a software module operating on the computer system, wherein an internal firewall is configured to separate the host system from the virtual system in the computer system, and a host-based firewall executed on the computer system is configured to implement network isolation between the computer system and the network; and at least one device configured to implement at least one of a network firewall or a web proxy, wherein the device comprises a processor and a memory configured to implement network isolation between one or more untrusted network destinations and the networked computer system.

2. The networked computer system of claim 1, wherein the internal firewall is configured to prevent data from being communicated between the virtual system and the host system without an explicit user input.

3. The networked computer system of claim 1, wherein the host system is configured to store data in a host memory space and the virtual system is configured to store data in a virtual memory space that is segregated from the host memory space.

4. The networked computer system of claim 1, wherein malware introduced to the computer system is prevented from moving to another computer system of the networked computer system.

5. The networked computer system of claim 1, wherein the computer system is configured to:
communicate with the one or more untrusted network destinations via a first communication connection,
communicate with one or more trusted network destinations via a second communication connection; and
enforce separation of the first communication connection from the second communication connection.

6. The networked computer system of claim 1, wherein the host-based firewall is configured to prevent lateral communication and movement of malware between the computer system and other devices on the networked computer system.

7. The networked computer system of claim 1, wherein the device is configured to prevent unauthorized communication between the computer system and the one or more untrusted network destinations.

8. The networked computer system of claim 1, wherein the host-based firewall is configured to implement a first policy when the computer system is connected to the network and a second policy when the computer system is connected to another network, wherein the first policy permits one or more communications between the host system of the computer system and one or more resources on the network and the second policy blocks communications egressing from the host system of the computer system but allows communications egressing from the virtual system.

9. The networked computer system of claim 1, wherein one or more applications or processes are configured to run in the virtual system, and wherein the one or more applications or processes running in the virtual system are configured to communicate with the one or more untrusted network destinations.

10. The networked computer system of claim 1, wherein one or more applications or processes are configured to run in the host system, and wherein the one or more applications or processes running in the host system are configured to communicate with one or more devices on the network.

11. A method of network isolation in a networked computer system, the method comprising:

providing a network and at least one computer system that is configured to connect to the network, the computer system comprising a host system and a virtual system, wherein the virtual system is a separate operating system or a software module operating on the computer system;

separating the host system from the virtual system using an internal firewall executed on the computer system;

implementing network isolation between the computer system and the network using a host-based firewall executed on the computer system;

providing at least one device configured to implement a network firewall or a web proxy; and implementing network isolation, between one or more untrusted network destinations and the networked computer system, via the at least one device.

12. The method of claim 11, wherein the internal firewall is configured to prevent data from being communicated between the virtual system and the host system without an explicit user input.

13. The method of claim 11, further comprising:
the host system storing data in a host data storage; and
the virtual system storing data in a virtual data storage.

14. The method of claim 11, further comprising preventing malware introduced to the computer system from moving to another computer system of the networked computer system.

15. The method of claim 11, further comprising:
communicating with the one or more untrusted network destinations via a first communication connection;
communicating with one or more trusted network destinations via a second communication connection; and
enforcing separation of the first communication connection from the second communication connection.

16. The method of claim 11, further comprising preventing, via the host-based firewall, lateral communication and movement of malware between the computer system and other devices on the networked computer system.

17. The method of claim 11, further comprising the at least one device preventing unauthorized communication between the computer system and the one or more untrusted network destinations.

18. The method of claim 11, further comprising:
implementing a first policy for the host-based firewall when the computer system is connected to the network, the first policy for the host-based firewall permitting one or more communications between the host system of the computer system and one or more resources on the network; and
implementing a second policy for the host-based firewall when the computer system is connected to another network, the second policy for the host-based firewall blocking communications egressing from the host system of the computer system but allowing communications egressing from the virtual system.

19. The method of claim 11, further comprising running one or more applications or processes in the virtual system that are configured to communicate with the one or more untrusted network destinations.

20. The method of claim 11, further comprising running one or more applications or processes in the host system that are configured to communicate with one or more devices on the network.

* * * * *